April 2, 1929.  A. ABBOTT  1,707,967
SUGAR DISPENSING CONTAINER
Filed April 1, 1924   2 Sheets-Sheet 1

Inventor
AUGUSTUS ABBOTT.
By A. B. Bowman
Attorney

Inventor
AUGUSTUS ABBOTT.
By A. B. Bowman
Attorney

Patented Apr. 2, 1929.

1,707,967

UNITED STATES PATENT OFFICE.

AUGUSTUS ABBOTT, OF SAN DIEGO, CALIFORNIA, ASSIGNOR, BY MESNE ASSIGNMENTS, TO TAYLOR BROTHERS MANUFACTURING CORPORATION, OF ELKHART, INDIANA, A CORPORATION OF INDIANA.

SUGAR-DISPENSING CONTAINER.

Application filed April 1, 1924. Serial No. 703,542.

Figure 1:
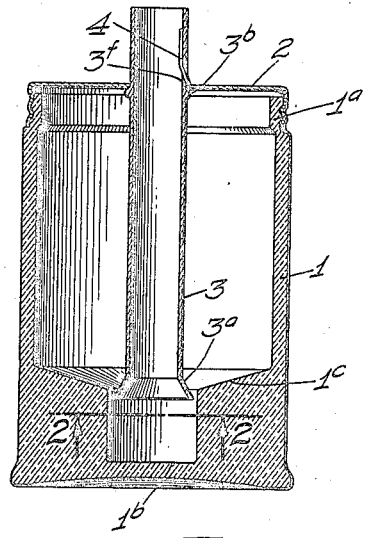
Figure 2:
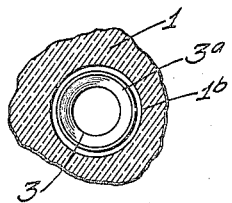
Figure 3:
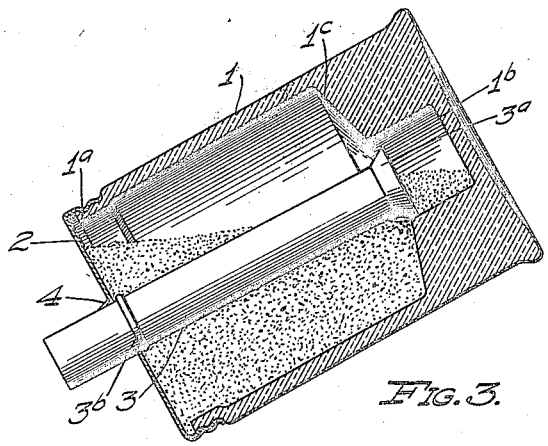
Figure 4:
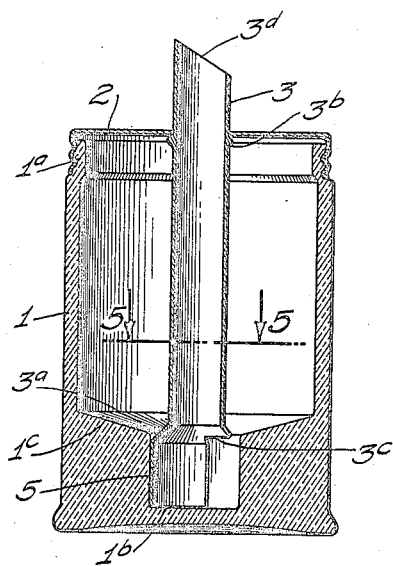
Figure 5:
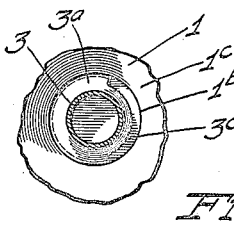
Figure 6:
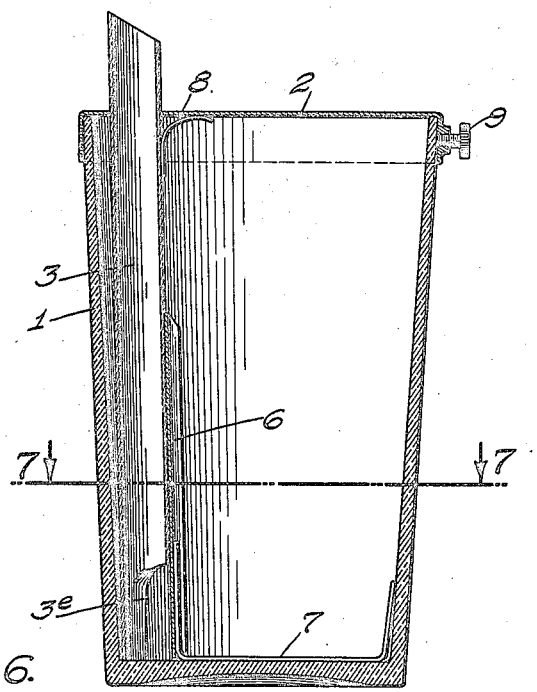
Figure 7:
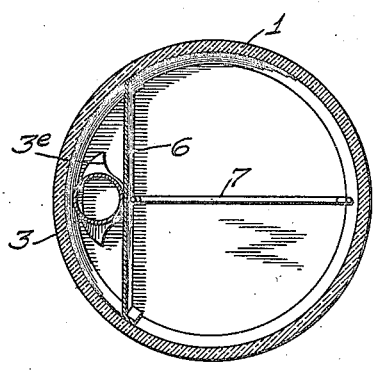

My invention relates to a sugar dispensing container, and the objects of my invention are: first, to provide a container for dispensing sugar or other similar products in measured quantities; second, to provide a container of this class for dispensing its contents in substantially uniform spoonfuls or other fixed units of measure; third, to provide a container of this class by which the product contained therein is adapted to be drawn or discharged from or near the bottom of the container, and which product is not retarded in its flow or discharge or otherwise materially affected by the crust usually forming on top of sugar and other similar products when standing for some time, as in the dispensing containers now in use; fourth, to provide a container of this class which is provided with a relatively large discharge opening so that the product contained therein may not readily clog the discharge means; fifth, to provide a container of this class which will function equally as well when the container is filled or when it is substantially drained of its contents, and by which substantially the last spoonful of its contents may be discharged through its discharge means; sixth, to provide a novelly constructed dispensing container of this class, and seventh, to provide such a container which is very simple and economical of construction, durable, simple in its action, and which will not readily deteriorate or get out of order:

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a sectional elevational view of my dispensing container in one form of construction, with the section taken through the middle thereof; Fig. 2 is a transverse sectional view thereof, taken through 2—2 of Fig. 1; Fig. 3 is a longitudinal sectional view thereof, with the section taken through the middle, showing the same in a position to discharge a measured quantity of its contents, and showing certain parts and portions thereof in elevation to facilitate the illustration; Fig. 4 is a sectional elevational view of my dispensing container in a slightly modified form of construction, with the section taken through the middle thereof; Fig. 5 is a transverse sectional view thereof, taken through 5—5 of Fig. 4; Fig. 6 is a sectional elevational view of another slightly modified form of construction of my dispensing container, with the section taken through the middle thereof, and Fig. 7 is a transverse sectional view thereof, with the section taken through 7—7 of Fig. 6.

Like characters of reference refer to similar parts and portions throughout the several views of the drawings.

The main container member 1, cover 2, discharge tube 3, and the discharge tube supporting member 4, constitute the principal parts and portions of my sugar dispensing container in one form of construction.

The main container member 1, which is preferably made of glass, is provided at its upper end with a removable cover 2, which is screwably secured to the threaded portion 1ª at the upper end of the container member 1. Said container member is provided with a measuring well or pocket 1ᵇ at its lower end or bottom, of only sufficient capacity to contain or furnish the amount of sugar or other product desired to be discharged through the discharge tube 3 at one time. In said well or pocket 1ᵇ is positioned the lower end of the discharge tube 3, which extends upwardly therefrom through the cover 2. At the lower end of the discharge tube is provided an inverted funnel shaped portion 3ª, which is slightly smaller at its periphery than the distance across the upper portion of the well or pocket 1ᵇ in the container member. It will be here noted that the enlarged portion of the funnel shaped portion 3ª of the tube 3 is positioned below the upper end of the inside well 1ᵇ. At the upper portion of the inside of the discharge tube is secured the tube supporting spring member 4, which extends through an opening 3ᶜ in the wall of the discharge tube and is adapted to engage the outside of the cover 2 for supporting the discharge tube. When desiring to remove the cover, the spring member 4 is depressed which releases the cover from engagement therewith. Intermediate the ends of the tube 3 is provided an annular shoulder 3ᵇ, which is adapted to engage the inner side of the cover and prevent the discharge tube from dropping out when the container is inverted. The portion 1c of the bottom of the container member 1, around the measuring well 1b therein, is funnel shaped so that the contents of the container may be more easily directed into said measuring well.

When desiring to dispense the contents of the container in measured quantities, the container is partially inverted or inclined, as shown in Fig. 3 of the drawings, which permits the inner end of the discharge tube 3 to be shifted laterally by gravity about its pivotal support in the cover 2, permitting the inverted, funnel shaped portion 3a at the inner end thereof to engage the walls of the well 1b, thus facilitating the discharge of substantially all of the contents of the well 1b into and out of the discharge tube. It will be noted that the space between the outer portion of the inverted, funnel shaped portion 3a and the wall of the well 1b, when the container is positioned as shown in Fig. 3, is not adapted to permit an appreciable part of the contents trapped in the well 1b to be discharged into the main portion of the container when the same is tilted to the position stated.

In the slightly modified form of construction of my dispensing container, shown in Figs. 4 and 5, the outer or peripheral portion of the funnel shaped portion 3a at the normally lower end of the discharge tube 3 is of substantially the same size and cross-section as the measuring well and is provided with a cutaway portion 3c at one side thereof to permit the contents of the main compartment of the container member 1 to be discharged into the measuring well. At the periphery of the funnel shaped portion 3a of the discharge tube is secured a downwardly extending supporting member 5, which extends preferably more than halfway around the wall of the measuring well, thus fixedly positioning the lower end of the discharge tube 3 at the lower end of the container. The outer end 3d of the discharge tube, in this modified form of construction, is cut off at an angle forming a spout, which serves as a guide for positioning or tilting the container for discharging the contents therefrom so that when the outer or longer portion of the spout of the discharge tube is positioned downwardly, when the container is tilted, the open or cutaway portion 3c at the lower end of the tube extends upwardly, thus preventing the contents in the measuring well to be discharged into the main compartment of the container.

In the other modified form of construction, shown in Figs. 6 and 7 of the drawings, the discharge tube 3 is positioned to one side and preferably near the wall of the container 1. To the lower portion of the tube 3 is secured a plate 6, which positions said tube laterally at its lower end and extends to the side walls of the container member 1 and preferably more than halfway from the bottom of the container to the cover 2. Said plate divides the interior of the container member 1 into two compartments, the one in which the lower end of the discharge tube is positioned being considerably smaller than the other and serving as a measuring well, as described in connection with the other structures. Said plate 6 is held in position against the walls of the container member 1 by means of a spring member 7 secured at the lower end thereof and extending across the bottom of the container member to the opposite side thereof, as shown in the drawings. Intermediate the ends of the discharge tube 3 and below the cover 2 is provided another spring member 8, which is adapted to be engaged by the cover 2 for supporting the discharge tube 3 in position. In this modified form of construction the cover 2 is secured to the upper open end of the container member 1 by means of a thumb screw 9. The lower end of the discharge tube 3 extending into the smaller measuring compartment is cut away at its inner side, indicated by 3e in Fig. 6, and bent outwardly as shown best in Fig. 7, so that the contents of the container in the measuring well are adapted to be directed into the discharge tube 3 when the container is tilted to the dispensing position. It will be noted that by this construction the contents of the container discharged at one time are substantially uniform, as described in connection with the other structures.

It will be here noted that the latter construction may be easily modified so that the plate 6 may be made an integral part of the container member 1 and that the discharge tube 3 may be loosely positioned at its lower end within the measuring compartment or well thus formed.

It is obvious from this construction, as illustrated in the drawings and disclosed in the foregoing specification, that there is provided a container for dispensing the contents thereof in measured quantities as aimed at and set forth in the objects of the invention, and though I have shown and described a particular construction, combination and arrangement of parts and portions and certain modifications thereof, I do not wish to be limited to this particular construction, combination and arrangement, nor to the modifications, but desire to include in the scope of my invention the construction, combination and arrangement substantially as set forth in the appended claims.

Having thus described my invention, what I claim as new and desire to secure by Letters Patent, is:

1. In a dispensing container, a container member provided with a main compartment having a measuring portion at the lower portion thereof, said measuring portion being adapted to receive substantially the amount of the contents adapted to be dispensed at one time from the main compartment of said container member, a cover for said container member, and a long discharge member positioned in said container member with its upper end loosely, pivotally and removably supported on said cover and its lower end extending into the measuring portion of said container member, and normally spaced on all sides from the side wall forming the measuring portion of said container member and adapted to engage the one side of the same when said container member is tilted.

2. In a dispensing container, a container member provided with a main compartment having a measuring portion at the lower portion thereof, said measuring portion being adapted to receive substantially the amount of the contents adapted to be dispensed at one time from the main compartment of said container member, a cover for said container member, and a long discharge member pivotally supported near its outer end by said cover and extending into the measuring portion of said container member.

3. In a dispensing container, a container member provided with a main compartment having a measuring compartment at the lower portion thereof, a cover for said container member, and a long discharge member positioned in said container member with its lower end extending into said measuring compartment and pivotally supported near its other end by said cover, the lower portion of said discharge member being spaced from the wall of said measuring compartment providing passage means for filling said measuring compartment from said main compartment.

4. In a dispensing container, a container member provided with a main and a measuring compartment communicating with each other, the latter forming an extension of the former, a cover for the container, and a discharge tube positioned in said container member with its normally lower end extending loosely into said measuring compartment and readily removably and shiftably supported near its upper end on said cover and relative to the measuring compartment whereby the contents of the container member may be slightly agitated without removing said tube from its discharge position.

5. In a dispensing container, a container member provided with a main compartment and also with a measuring compartment at the lower portion of said container member communicating with said main compartment, and a discharge tube positioned within said container member with its normally lower end loosely extending into said measuring compartment and normally spaced on all sides from the side wall forming said measuring compartment permitting free agitating movement relative to said side walls.

6. In a dispensing container, a container member provided with a main compartment having a measuring portion at the lower portion thereof, said measuring portion being adapted to receive substantially the amount of the contents adapted to be dispensed at one time from the main compartment of said container member, a cover secured to the upper open end of said container member, and a long discharge member positioned in said container member with its normally lower end extending loosely into said measuring portion and with its normally outer end loosely supported by said cover whereby the contents of the container member may be readily agitated without removing the discharge member from its discharge position, said discharge member being adapted to be shifted relative to the measuring portion from the outer end of the discharge member.

In testimony whereof, I have hereunto set my hand at San Diego, California, this 27th day of March, 1924.

AUGUSTUS ABBOTT.